(12) United States Patent
Zakowski

(10) Patent No.: US 9,867,504 B2
(45) Date of Patent: Jan. 16, 2018

(54) LOCKING MECHANISM FOR FOOD PROCESSOR BLADE ASSEMBLY

(71) Applicant: Joseph W. Zakowski, New Canann, CT (US)

(72) Inventor: Joseph W. Zakowski, New Canann, CT (US)

(73) Assignee: CONAIR CORPORATION, Stamford, CT (US)

( * ) Notice: Subject to any disclaimer, the term of this patent is extended or adjusted under 35 U.S.C. 154(b) by 0 days.

(21) Appl. No.: 14/245,449

(22) Filed: Apr. 4, 2014

(65) Prior Publication Data

US 2014/0299694 A1   Oct. 9, 2014

Related U.S. Application Data

(60) Provisional application No. 61/809,483, filed on Apr. 8, 2013.

(51) Int. Cl.
*A47J 43/07* (2006.01)

(52) U.S. Cl.
CPC ....... *A47J 43/0722* (2013.01); *A47J 43/0716* (2013.01)

(58) Field of Classification Search
CPC .. A47J 43/0711; A47J 43/0722; A47J 43/046; A47J 43/0716; B02C 18/20; B02C 18/12; B02C 2/04; B02C 2/00
USPC .................................. 241/282.1, 282.2, 286
See application file for complete search history.

(56) References Cited

U.S. PATENT DOCUMENTS

| | | | | |
|---|---|---|---|---|
| 2,953,179 | A * | 9/1960 | Friess | B02C 18/30 241/102 |
| 4,560,111 | A * | 12/1985 | Cavalli | A47J 43/0722 241/282.2 |
| 4,872,764 | A * | 10/1989 | McClean | 366/251 |
| 7,070,133 | B1 * | 7/2006 | Harlow | 241/30 |
| 2002/0047060 | A1 * | 4/2002 | Juriga | 241/92 |
| 2003/0226923 | A1 * | 12/2003 | Starr et al. | 241/282.1 |
| 2004/0056130 | A1 * | 3/2004 | Gursel | 241/282.1 |
| 2005/0178863 | A1 * | 8/2005 | Carnevale et al. | 241/36 |
| 2007/0215735 | A1 * | 9/2007 | Mulle | 241/282.1 |
| 2011/0265665 | A1 * | 11/2011 | Goncalves et al. | 99/538 |
| 2011/0265666 | A1 * | 11/2011 | Beber | A47J 43/0722 99/538 |

FOREIGN PATENT DOCUMENTS

DE   19646423 A1 *   5/1998   ............. A47J 42/56

* cited by examiner

*Primary Examiner* — Anthony Stashick
*Assistant Examiner* — Onekki Jolly
(74) *Attorney, Agent, or Firm* — Grogan, Tuccillo, Vanderleeden, LLP

(57) ABSTRACT

A blade assembly for a food processor is provided. The blade assembly includes a body, a top knob slidably movable relative to the body, and at least one blade fixed to the body. The knob is movable from a first position, in which the blade assembly is locked to the bowl of the food processor, to a second position, in which the blade assembly is unlocked from the bowl.

10 Claims, 2 Drawing Sheets

LOCKING MECHANISM FOR FOOD PROCESSOR BLADE ASSEMBLY

CROSS-REFERENCE TO RELATED APPLICATIONS

This application claims the benefit of U.S. Provisional Application Ser. No. 61/809,483, filed on Apr. 8, 2013, which is herein incorporated by reference in its entirety.

FIELD OF THE INVENTION

The present invention relates to food processors and, more particularly, to a food processor blade assembly having a blade lock.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of ease of use. In particular, a limitation of existing food processors is that they typically only utilize a press fit or friction fit to secure the blade assembly to the work bowl.

SUMMARY OF THE INVENTION

It is an object of the present invention to provide a food processor having a blade assembly.

It is another object of the present invention to provide a blade assembly for a food processor that include a means for securely locking the blade to a work bowl of the food processor.

These and other objects are achieved by the present invention.

According to an embodiment of the present invention, a blade assembly for a food processor is provided. The blade assembly includes a body, a top knob slidably movable relative to the body, and at least one blade fixed to the body. The knob is movable from a first position, in which the blade assembly is locked to the bowl of the food processor, to a second position, in which the blade assembly is unlocked from the bowl.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
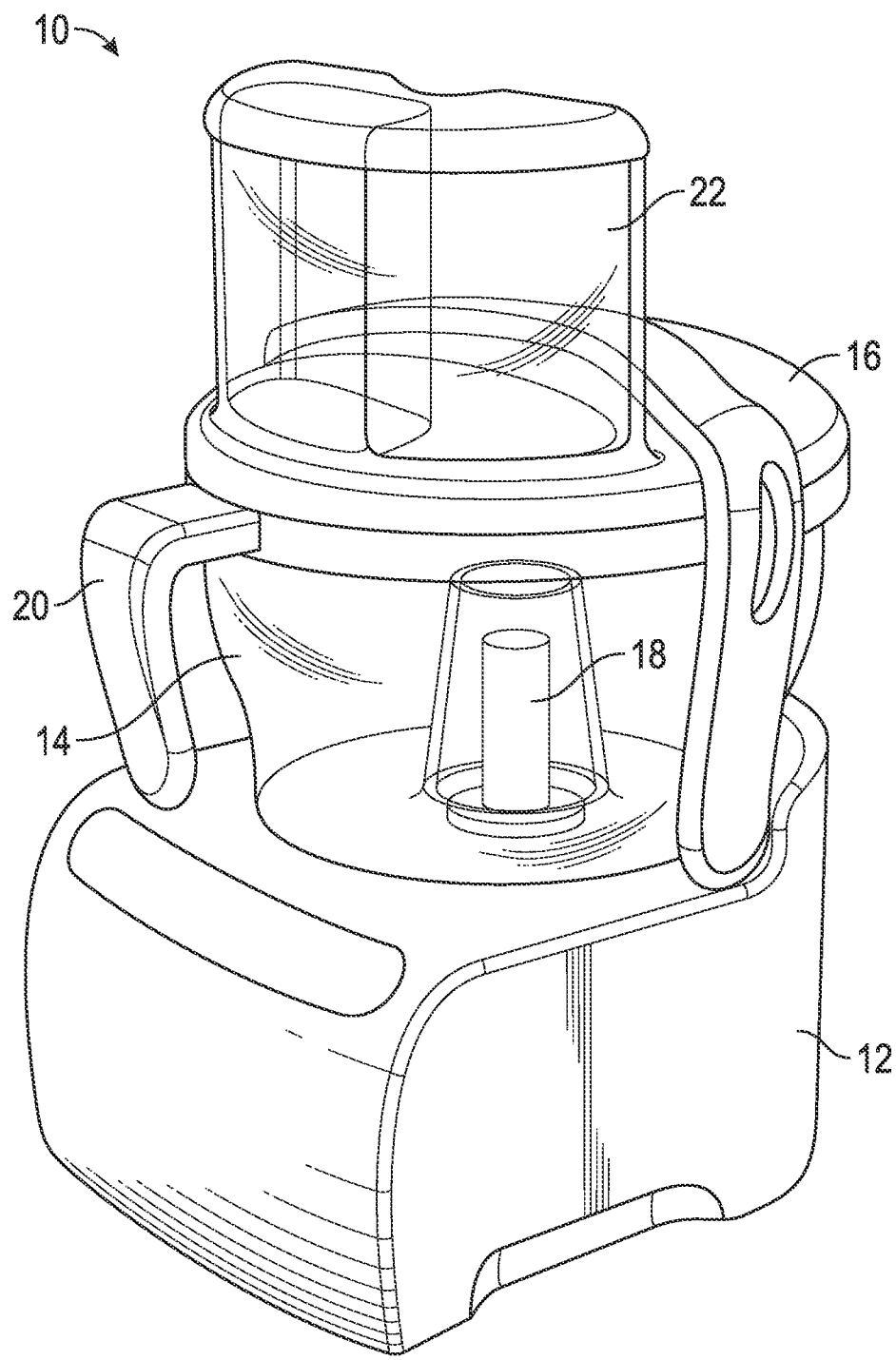
FIG. 1 is a perspective view of a food processor according to an embodiment of the present invention.

Referring to FIG. 1, a food processor 10 according to the present invention is shown. The food processor 10 includes a base 12, a work bowl or receptacle 14 received on the base 12, and a lid 16 configured to be selectively removable from the work bowl 14. Base 12 includes a motor or other rotary drive mechanism (not shown) connected to a rotatable output shaft 18 for rotatably driving a blade interior to the work bowl 14 and may include controls (not shown) for varying settings of the motor.

As further shown therein, work bowl 14 is generally cylindrical or frusto-conical in shape and has a handle 20 and a pour spout (not shown). The lid 16 defines a substantially circular body sized and is dimensioned to cover work bowl 14. The lid 16 also includes a feed tube opening (not shown). The feed tube opening may be generally oval in shape, although other shapes and dimensions are envisioned without departing from the broader aspects of the present invention.

As best shown in FIG. 1, the lid 16 may also include a feed tube 22 defining a substantially annular body having a substantially oval cross-section extending upwards from the lid 16 and in communication with the feed tube opening. As is well known in the art, the feed tube 22 provides a chute through which a user may load food items to be processed into the work bowl 14.

Figure 2:
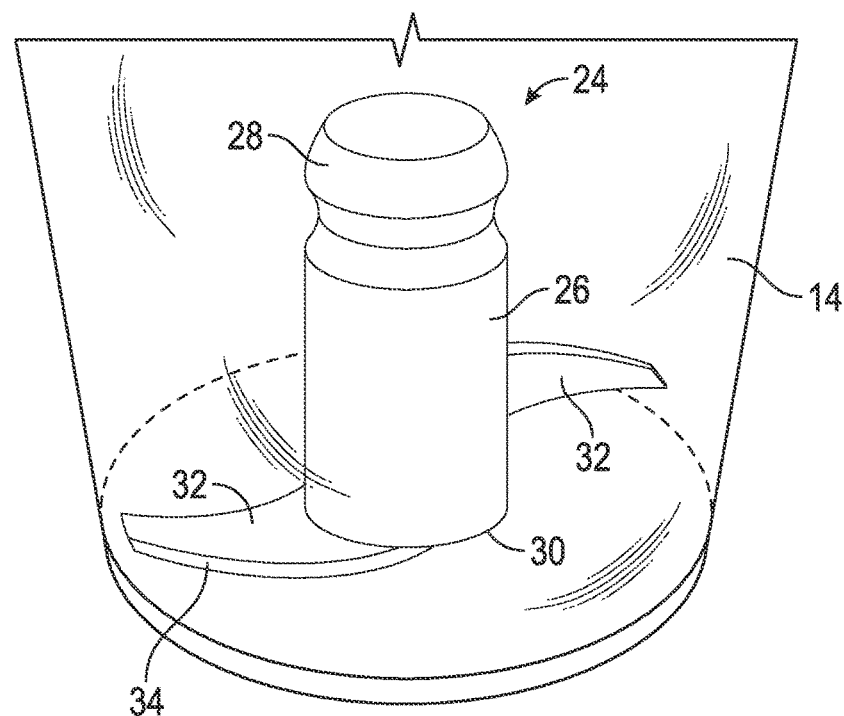
FIG. 2 is a perspective view of a blade assembly of a food processor according to an embodiment of the present invention, illustrating the blade assembly in a locked position.
Figure 3:
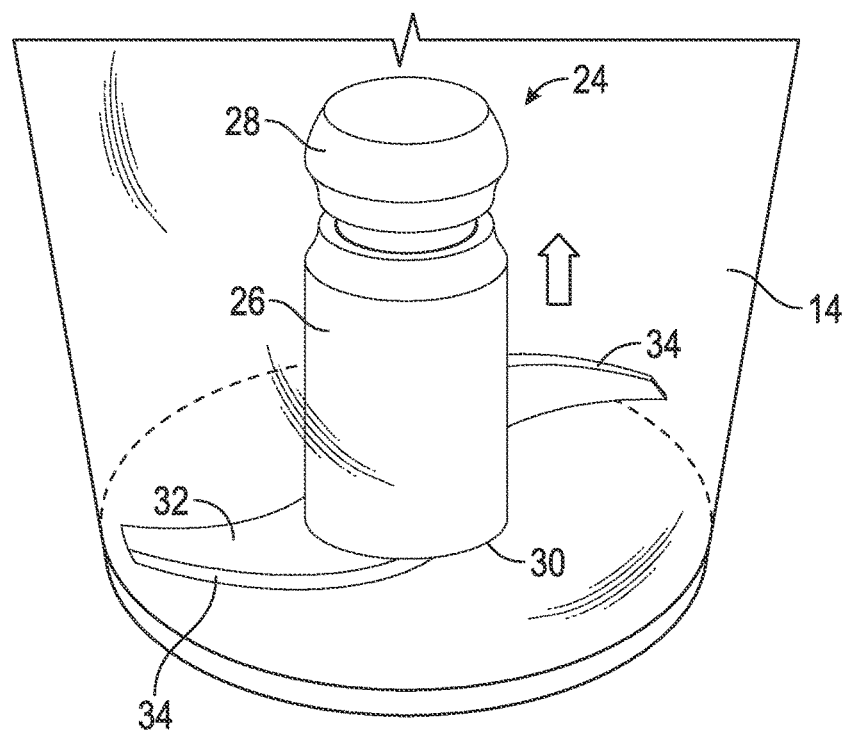
FIG. 3 is a perspective view of the blade assembly of FIG. 2, illustrating the blade assembly in an unlocked position.

Turning now to FIGS. 2 and 3, a blade assembly 24 for use with the food processor 10 is shown. The blade assembly 24 includes a body 26 having a top, closed end or knob 28 slidably movable relative to the body 26, a bottom end 30 formed with an opening (not shown) at its end, and an interior chamber (not shown). A pair of opposed blades 32 having cutting edges 34 is fixed to the body 26. The blade assembly 24 is adapted to engage the shaft 18 of the motor in order to transmit torque therefrom in order to rotationally drive the blade assembly 24.

As further shown therein, in operation, the blade assembly 24 may be positioned on the output shaft 18 extending though the bottom of the food processor work bowl 14. The top end 28 of the blade assembly 24 may then be pushed down, into contact with the body 26, to securely lock the blade assembly 24 to the work bowl 14. As shown in FIG. 3, the top 28 may be pulled up, in the direction of arrow A, to unlock the blade assembly 24 from the bowl 14. As will be readily appreciated, this is in contrast to existing food processing devise which use a press fit or friction fit to secure the blade assembly to the bowl.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor, comprising:
   a base;
   a motor disposed within said base;

an output shaft operatively connected to said motor and extending outwardly from said base, said output shaft being rotatable upon actuation of said motor;

a work bowl received on said base;

a lid receivable atop said work bowl; and a blade assembly received on said output shaft, said blade assembly including a body, a knob coupled to said body and slidably movable relative to said body, and at least one blade having a cutting edge fixed to said body;

wherein said knob is selectively movable between a first position, in which said knob is in close association with said body and said blade assembly is locked to one of said work bowl and said output shaft, and a second position, in which said knob is pulled up from said first position and is spaced from said body;

wherein said pulling up of said knob from said first position to said second position causes said blade assembly to be unlocked and being removable from said output shaft; and wherein neither said output shaft nor said blade assembly contact said lid;

wherein in said second position, said knob remains connected to said body.

2. The food processor of claim 1, wherein:
said body is cylindrically shaped.

3. The food processor of claim 2, wherein:
said at least one blade is a pair of opposed blades.

4. The food processor of claim 3, wherein:
each of said blades is arcuate in shape and has a cutting edge formed on a leading edge of said blade.

5. The food processor of claim 1, wherein:
said blade assembly includes an opening at a bottom end of said body and an interior chamber.

6. The food processor of claim 1, wherein:
said work bowl is removably received on said base.

7. The food processor of claim 1, further comprising:
a lid removably received atop said work bowl.

8. The food processor of claim 1, wherein:
said lid includes a feed tube extending from said lid and adapted to receive a food product therethrough for guiding said food product into said work bowl.

9. The food processor of claim 3, wherein:
said blades are offset from one another along a longitudinal extent of said body.

10. A blade assembly for a food processor, comprising:
a body;

a knob coupled to said body and slidably movable relative to said body; and at least one blade having a cutting edge fixed to said body;

wherein said knob is selectively movable between a first position, in which said knob is in close association with said body, and a second position, in which said knob is spaced from said body;

wherein in said first position, said blade assembly is configured to lockingly engage one of a work bowl and an output shaft of said food processor; and wherein the moving of said knob from said first position to said second position causes said blade assembly to be unlocked and being removable from said output shaft while said knob remains connected to said body.

* * * * *